May 8, 1928. 1,669,082

V. A. FYNN

SYNCHRONOUS MOTOR

Filed June 12, 1926

Inventor:
VALÈRE ALFRED FYNN,
By John W Bruninga
His Attorney.

Patented May 8, 1928.

1,669,082

UNITED STATES PATENT OFFICE.

VALÈRE A. FYNN, OF ST. LOUIS, MISSOURI.

SYNCHRONOUS MOTOR.

Application filed June 12, 1926. Serial No. 115,420.

My invention relates to synchronous motors and particularly to polyphase synchronous induction motors, i. e. to machines which possess the mechanical features of an asynchronous motor and are adapted to carry variable load at synchronous speed.

One of the objects of my invention is to provide such an arrangement of windings on the secondary of a synchronous motor and to so combine them with a source of current as will enable the machine to start as an induction motor, to synchronize and to operate synchronously over a range of loads while utilizing all of the secondary windings at starting as well as in synchronous operation. Other objects of my invention are to utilize at least some of these same windings to produce a substantially or strictly unidirectional synchronizing torque and, when desired, to produce a secondary unidirectional magnetization in synchronous operation which increases with increasing load. The nature and the objects of my invention are fully set forth in the specification taken in conjunction with the accompanying drawings and its nature is particularly pointed out in the appended claims.

Figure 1:
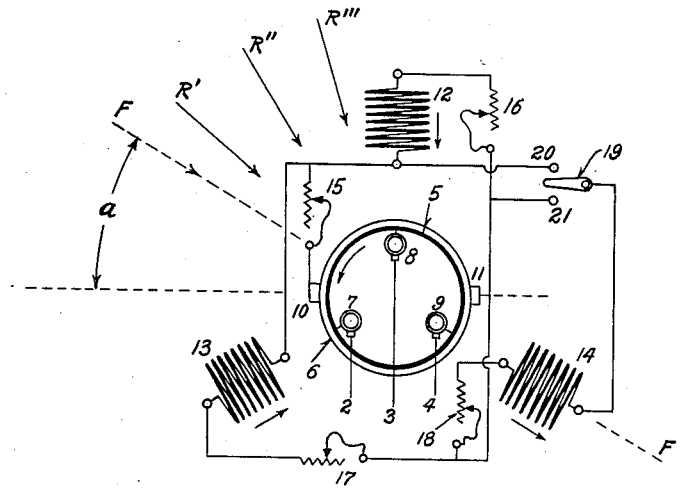
Figure 2:
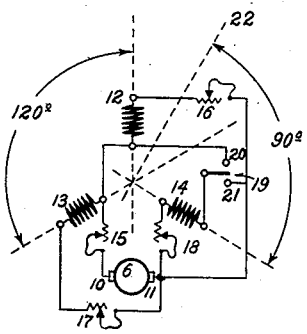

In the accompanying diagrammatic drawings Fig. 1 shows a two-pole motor embodying my invention while Fig. 2 shows a two-pole secondary provided with one form of my improved arrangement of secondary windings and with one form of the connections between said windings and an exciter.

Referring to Fig. 1 which illustrates a three-phase synchronous motor with revolving primary, the rotor carries a primary winding 5 connected to the sliprings 7, 8, 9 and, through cooperating brushes, to the supply 2, 3, 4. The rotor also carries a commuted winding 6 with which cooperate the stationary brushes 10, 11 supported in some convenient manner by the stator. The stator carries three windings 12, 13, 14 displaced by 120 electrical degrees, just like the several phases of an ordinary three phase winding. The winding 12 is connected to the brushes 10, 11 by way of the adjustable resistances 15 and 16, the winding 13 is similarly connected by way of the adjustable resistances 15 and 17 and by placing switch 19 on point 20 the winding 14 can be connected to the brushes 10, 11 by way of the adjustable resistances 15 and 18. By moving switch 19 over to point 21 the circuit of the winding 14 can be closed independently of the brushes 10, 11 or of the commuted winding. The connections between the windings 12, 13 and the brushes 10, 11 are so made that current conduced into these windings, by the source of auxiliary voltage of which the commuted winding 6 and the brushes 10, 11 are each a part, produces magnetizations directed as indicated by the arrows seen alongside of the windings in question.

If the conduced ampereturns are of equal magnitude in 12 and in 13 then the resultant magnetization due to them will lie along an axis bisecting the angle of 120 electrical degrees by which 12 and 13 are displaced and coinciding with the axis of the winding 14. When 19 stands on 20 the winding 14 is so connected to the brushes 10, 11 as to produce conduced ampereturns responsible for a coaxial and codirectional magnetization with respect to the axis of the magnetization resulting from the ampereturns in 12 and 13. In such case the total secondary magnetization F is coaxial with the winding 14. If the magnetization produced by 12 is not the same as that produced by 13 then the axis of their resultant will deviate from the axis of the magnetization due to 14, the axis of F will also deviate from that of 14 but the magnetization produced by the latter will have at least one component which is coaxial and codirectional with the axis of the magnetization resulting from the conduced ampereturns in 12 and 13. The axis of the brushes 10, 11 is shown by way of example, as displaced by 30 electrical degrees from the axis of the total secondary magnetization due to conduced currents derived from the brushes 10, 11. The displacement is in the direction of rotation of the primary and therefore against the direction of rotation of the primary flux with respect to the primary.

Fig. 2 shows the corresponding arrangement of the windings on the secondary of a machine with stationary primary. These windings are connected to a source of auxiliary voltage 6 located outside the motor. For the sake of clearness the sliprings which would be here necessary in practice are not shown since they are not essential to the understanding of the invention. As a further simplification the brushes 10, 11 in both figures are shown as resting directly on the commuted winding with which they cooperate and which is represented by a plain circle 6. In practice a commutator would usually be interposed. Fig. 2 also does duty as an explanatory diagram.

Referring to the mode of operation, let it be assumed that the windings 12, 13, 14 all have the same number of turns, the same space distribution and the same ohmic resistance, also that switch blade 19 stands on point 20. So soon as the primary is connected to the three phase supply 2, 3, 4 a primary flux is produced which revolves synchronously with respect to the primary 5. Let this flux revolve clockwise. Since 12, 13, 14 are in inductive relation to this revolving flux, phase displaced voltages will be generated in these windings and cause generated currents to flow in the circuits of which said windings form a part. Such generated currents can close through each of the windings 12, 13, 14 and the commuted winding 6. The generated currents in each of the circuits including the commuted winding can be controlled independently by the resistances 16, 17 and 18 respectively, and they can be controlled collectively by the resistance 15. The generated currents close through a common element, which is the commuted winding 6, but nevertheless produce regular polyphase, here three phase, ampereturns on the secondary. The resultant of these polyaxial and polyphase ampereturns revolves at slip frequency with respect to the secondary and causes the machine to develop an induction motor torque the magnitude of which is controllable by the resistance 15 or the magnitude and configuration of which can be controlled by any of the resistances 16, 17, 18. But generated currents can simultaneously close through the circuit comprising the winding 12 the resistances 16, 17 and the winding 13, also through the circuit comprising 12, 16, 18, 14 and 19, 20 and finally through the circuit comprising 13, 17, 18, 14 and 19, 20. These three circuits constitute a three phase winding on the secondary, one phase of which, here 14, is reversed. Generated currents circulating in these circuits tend to unbalance the secondary. For this reason I have so located the starting and regulating resistances 16, 17, 18 that when blade 19 stands on point 20, each circuit which does not include the commuted winding but carries generated currents, includes two of these resistances in series whereas but one of the resistances 16, 17 or 18 is included in each of the brush circuits. Since, as already stated, the brush circuits carrying generated currents are entirely independent one from the other and produce properly phased and properly distributed three phase ampereturns on the secondary adapted to produce a sufficiently uniform induction motor torque, I prefer at starting to reduce the generated currents in the induced secondary circuits which do not comprise the commuted winding and increase them in those which do. To this end I can reduce the regulating resistance 15 to zero and start and accelerate the machine by handling the resistances 16, 17, 18 according to the starting torque requirements, diminishing the resistances to increase the torque.

Practical requirements make it necessary to use a low auxiliary voltage, mostly somewhere around 15 to 50 volts. Under these conditions the voltages generated in the windings 12, 13 and 14 at starting may easily reach 500 to 700 volts. Furthermore the magnitude of the auxiliary voltage at the brushes 10, 11 is independent of the speed and only depends on the magnitude of the primary flux which may have its full value at starting or reach this full value before synchronism is reached. For these reasons the effect of the auxiliary voltage on the starting performance is not pronounced.

The primary flux revolves clockwise in Fig. 1, the rotor therefore starts in a counterclockwise direction. Because the primary flux must maintain a synchronous speed with respect to the primary the speed of said flux with respect to the secondary diminishes as the rotor speed increases. This causes the frequency of the auxiliary voltage to diminish from line to zero frequency which obtains when the rotor runs synchronously. At that time the primary flux is stationary with respect to the secondary but still moves synchronously with respect to the commuted winding thus maintaining the amplitude of the voltages generated in said winding at a constant value except for changes in the magnitude of the primary flux.

As the motor speed increases the generated voltages in 12, 13, 14 are reduced and become zero at synchronism. Near synchronism the generated voltages may be neglected and the auxiliary voltage becomes the deciding factor not only because its amplitude does not diminish with increasing motor speed but because its frequency diminishes and the impedance of the windings 12, 13, 14 therefore also decreases. The auxiliary voltage forces current into the windings 12, 13, 14 and produces therein conduced single-phase ampereturns which magnetize the secondary along a single axis F per pole pair. In Fig. 1 the brush axis leads the axis of the resultant monoaxial single-phase magnetization by 30 electrical degrees, this causes the auxiliary voltage to lead the phase of the voltage generated by the primary flux near synchronism in 14, or more generally, the resultant of the voltages generated in the single-phase circuit by about 30 phase degrees. This location of the brush axis with reference to F or this phase relation between the auxiliary voltage and the resultant of the generated voltages causes the conduced single-phase ampereturns on the secondary to produce in conjunction with the primary flux an alternating synchronizing torque which has greater positive than negative maxima. Any angular displacement $a$ of about 45 electrical degrees or any phase angle of about this value will make possible the production of a substantially unidirectional synchonizing torque in which the positive maxima will be greatly in excess of the negative maxima, the latter only being about 18% of the former.

When there is phase coincidence between the auxiliary voltage and the resultant of the generated voltages or when the brush axis coincides with that of F then the synchronizing torque is pulsating but strictly unidirectional. The compounding characteristic of the machine corresponding to a strictly unidirectional synchronizing torque is not as desirable as that corresponding to a substantially unidirectional synchronizing torque when the latter is secured with the help of an auxiliary voltage which leads the resultant of the voltages generated in the secondary windings on which said auxiliary voltage is impressed.

Expressing the conditions in different terms, a strictly unidirectional synchronizing torque is secured when the conduced single-phase slip frequency ampereturns on the secondary reach their maximum at a time when their axis is in space quadrature with that of the primary flux. This means that these conduced ampereturns will be zero when their axis coincides with that of the primary flux. A substantially unidirectional synchronizing torque is secured when the conduced slip frequency ampereturns reach their maximum at a time when the axis of the primary flux is displaced by about 45 degrees or more from the axis of said conduced ampereturns. For most purposes the best results, in so far as both the synchronizing and the synchronous performances are concerned, are secured when this space displacement amounts to about 70 electrical degrees.

When the motor of Fig. 1 reaches synchronism the primary flux becomes stationary with respect to the secondary, it is then in the main due to the resultant of the ampereturns in the primary 5 and of the secondary ampereturns F, and is referred to as the resultant motor magnetization R. The machine can readily be so proportioned that the no-load position R' of R falls very close to F as shown in Fig. 1. When the load on the synchronously operating motor increases, the rotor momentarily departs from synchronism and a readjustment of the relative positions of F and R follows.

As the load increases the axis of the resultant motor magnetization R deviates more and more from the axis of F as shown by the arrows R', R'', R'''. This resultant motor magnetization is the one which determines the magnitude of the brush or auxiliary voltage and it is seen that when, with increasing load, the brush axis is displaced as shown with respect to the axis of F, the auxiliary voltage increases with increasing motor load causing the secondary unidirectional magnetization to increase when the load on the motor increases, thus compounding the machine.

One way of eliminating at subsynchronous speeds, generated ampereturns on the secondary which do not produce polyphase ampereturns the resultant of which revolves at slip frequency, or when so revolving varies unduly in magnitude, is to throw switch 19 of Fig. 1 over to point 21 at starting and moving it back to 20 after the motor has reached a sufficient speed, but preferably near synchronism.

With switch 19 of Fig. 1 on point 21, the circuits in which voltages generated by the primary flux can produce generated ampereturns which do not close through the commuted winding 6 are as follows. The circuit comprising winding 14, resistance 18 and the switch 19, 21 and the circuit comprising windings 12 and 13 and the resistances 16, 17. The first circuit produces generated ampereturns located along the axis of 14, the second produces generated ampereturns located along the axis 22 of Fig. 2, these ampereturns resulting from those in 12 and 13. They are in phase and space quadrature with respect to the ampereturns in 14 and produce two-phase ampereturns on the secondary the axis of which revolves with slip frequency with respect to the secondary.

But generated ampereturns also close through 12, 16, 11, 6, 10 and 15 and through 13, 17, 11, 6, 10 and 15. These generated ampereturns are displaced by 120 electrical degrees in space from each other and from the generated ampereturns in 14. These three sets of generated ampereturns also differ from each other by 120 degrees in phase and therefore produce a set of three-phase ampereturns on the secondary the axis of which revolves with slip frequency with respect to the secondary. The two-phase and the three-phase generated slip frequency ampereturns produce a desirable induction-motor-torque to start the motor but of course diminish with increasing speed and become zero at synchronism. They are unable to synchronize the motor.

The auxiliary voltage at the brushes 10, 11 is of little consequence at starting but near synchronism it becomes preponderant and conduces into the windings 12 and 13 on the secondary currents of slip frequency which produce single phase ampereturns the axis of the resultant of which is F. These ampereturns are monoaxial per pole pair and their axis does not revolve with respect to the secondary at slip or at any other frequency. These conduced single-phase ampereturns produce the synchronizing torque under the conditions and in the manner already explained. The machine can readily synchronize with switch 19 on point 21 but the synchronizing torque can be increased by moving switch 19 over to point 20, preferably when the motor speed is near the synchronous. This reestablishes the conditions first discussed but at a time when the generated ampereturns are so small that their distribution or phase relation is of no consequence.

The source of the auxiliary voltage is immaterial but unless it is always of slip frequency and therefore becomes unidirectional at synchronism and unless its amplitude does not become zero at synchronism no unidirectional or substantially unidirectional synchronizing torque can be secured. If the auxiliary voltage is unidirectional at all times then an alternating synchronizing torque is secured which has negative and positive maxima of equal amplitude.

Whether the primary revolves or is stationary is immaterial in so far as the principle of operation is concerned but of course involves well understood structural modifications.

While theories have been advanced as to operation of the machines and methods here described, this has been done with a view to facilitating the description thereof and it is to be understood that I do not bind myself to these or any other theories.

It will be clear that various changes may be made in the details of this disclosure without departing from the spirit of this invention, and it is, therefore, to be understood that this invention is not to be limited to the specific details here shown and described.

What I claim is:

1. An alternating current motor which carries variable load at synchronous speed, having a primary and a secondary, a commuted winding on the primary, one set of brushes per pole pair cooperating with the commuted winding to make available an auxiliary voltage which is of slip frequency near synchronism and becomes unidirectional at synchronism, three displaced windings on the secondary all connected in parallel and to the brushes, the connections being so made that at least a component of the secondary magnetization produced by current conduced into one of the displaced windings is coaxial and codirectional with respect to the axis of the secondary magnetization resulting from currents conduced into the two other displaced windings, the axis of said brushes being displaced from the perpendicular to the axis of the resultant of all three secondary conduced magnetizations.

2. An alternating current motor which carries variable load at synchronous speed, having a primary and a secondary, a commuted winding on the primary, one set of brushes per pole pair cooperating with the commuted winding to make available an auxiliary voltage which is of slip frequency near synchronism and becomes unidirectional at synchronism, three displaced windings on the secondary all connected in parallel and to the brushes, the connections being so made that at least a component of the secondary magnetization produced by currents conduced into one of the displaced windings is coaxial and codirectional with respect to the axis of the secondary magnetization resulting from current conduced into the two other displaced windings, the axis of said brushes being displaced from the perpendicular to the axis of the resultant of all three conduced secondary magnetizations, and means for closing the circuit of the first of the displaced windings independently of the commuted winding at starting.

3. A motor which carries variable load at synchronous speed, having a primary adapted to produce a primary flux which revolves with respect to the primary, a commuted winding on the primary, one set of brushes cooperating with the commuted winding to make available an auxiliary voltage which is of slip frequency near synchronism and becomes unidirectional at synchronism, a secondary, three windings on the secondary displaced by 120 electrical degrees and in inductive relation to the primary flux, means for connecting two of these windings in parallel and to the brushes cooperating with the commuted winding, said brushes being so located that their axis is displaced from the perpendicular to the axis of the secondary magnetization resulting from currents conduced into said two displaced windings, and connections between the brushes and the third winding on the secondary adapted to conduce current into this third displaced winding to produce a magnetization at least one component of which is coaxial and codirectional with the axis of the conduced magnetization resulting from the first two displaced windings.

4. An alternating current motor which carries variable load at synchronous speed, having a primary and a secondary, a commuted winding on the primary, one set of brushes per pole pair cooperating with the commuted winding to make available an auxiliary voltage which is of slip frequency near synchronism and becomes unidirectional at synchronism, three displaced windings on the secondary all connected in parallel and to the brushes, the connections being so made that at least a component of the secondary magnetization produced by current conduced into one of the displaced windings is coaxial and codirectional with respect to the axis of the secondary magnetization resulting from currents conduced into the two other displaced windings.

5. A motor which carries variable load at synchronous speed, having a primary adapted to produce a primary flux which revolves with respect to the primary, a commuted winding on the primary, one set of brushes cooperating with the commuted winding to make available an auxiliary voltage which is of slip frequency near synchronism and becomes unidirectional at synchronism, a secondary, three windings on the secondary displaced by 120 electrical degrees and in inductive relation to the primary flux, means for connecting two of these windings in parallel and to the brushes cooperating with the commuted winding, said brushes being so located that their axis is displaced from the perpendicular to the axis of the secondary magnetization resulting from currents conduced into said two displaced windings, connections between the brushes and the third winding on the secondary adapted to conduce current into this third displaced winding to produce a magnetization at least one component of which is coaxial and codirectional with the axis of the conduced magnetization resulting from the first two displaced windings, and means for adjusting the axis of the conduced magnetization produced by two of the displaced secondary windings with respect to the axis of the conduced magnetization produced by the third displaced winding.

6. A motor which carries variable load at synchronous speed, having a primary and a secondary, windings on the primary adapted to produce a primary flux which revolves with respect to the primary, three displaced windings on the secondary in inductive relation to the primary, a source of auxiliary voltage which is of slip frequency near synchronism and becomes unidirectional at synchronism, connections to form circuits including the three displaced windings on the secondary adapted to cause the primary flux to generate a two phase magnetization on the secondary to start the motor, connections to form circuits including the source and each of the displaced windings adapted to cause the primary flux to generate a three phase magnetization on the secondary and to cause the source to produce a single phase magnetization thereon, and means for adjusting the phase of the slip frequency voltage delivered by the source adapted to cause the single phase magnetization to produce in conjunction with the primary flux a substantially unidirectional synchronizing torque.

7. A motor which carries variable load at synchronous speed, having a primary and a secondary, windings on the primary adapted to produce a primary flux which revolves with respect to the primary, three windings on the secondary displaced by 120 electrical degrees and in inductive relation to the primary, a source of auxiliary voltage which is of slip frequency near synchronism and becomes unidirectional at synchronism, connections to form circuits including the three windings on the secondary adapted to cause the primary flux to generate polyphase ampereturns on the secondary to start the motor, connections to form circuits including the source and the three windings on the secondary adapted to cause the current from the source to produce single phase ampereturns on the secondary, and means for adjusting the phase of the single phase ampereturns adapted to cause the single phase magnetization to reach a maximum whenever the axis of the primary flux is materially displaced from the axis of said single-phase ampereturns, whereby a substantially unidirectional synchronizing torque is secured.

8. A motor which carries variable load at synchronous speed, having a primary adapted to produce a primary flux which revolves with respect to the primary, a commuted winding on the primary, one set of brushes cooperating with the commuted winding to make available an auxiliary voltage which is of slip frequency near synchronism and becomes unidirectional at synchronism, a secondary, three windings on the secondary displaced by 120 electrical degrees and in inductive relation to the primary flux, connections to form circuits including the windings on the secondary adapted to cause the primary flux to generate polyphase ampereturns on the secondary to start the motor, connections to form circuits including the brushes cooperating with the commuted winding and the three windings on the secondary adapted to cause the brush voltage to produce single phase ampereturns on the secondary, said brushes being positioned along an axis materially displaced from the perpendicular to the axis of the single phase ampereturns on the secondary.

In testimony whereof I affix my signature this 25th day of May, 1926.

VALÈRE A. FYNN.